(12) United States Patent
Janutin et al.

(10) Patent No.: US 7,363,711 B2
(45) Date of Patent: Apr. 29, 2008

(54) RECIPROCATING MACHINE TOOL

(75) Inventors: Andreas Janutin, Chur (CH); Andreas Neuweiler, Chur (CH); Clause Böhringer, Igis (CH)

(73) Assignee: TRUMPF Gruesch AG, Gruesch (CH)

( * ) Notice: Subject to any disclaimer, the term of this patent is extended or adjusted under 35 U.S.C. 154(b) by 81 days.

(21) Appl. No.: 11/341,901

(22) Filed: Jan. 27, 2006

(65) Prior Publication Data
US 2007/0039191 A1    Feb. 22, 2007

Related U.S. Application Data

(63) Continuation of application No. PCT/EP04/07460, filed on Jul. 8, 2004.

(30) Foreign Application Priority Data
Jul. 30, 2003    (EP) ................... 03017222

(51) Int. Cl.
*B26B 15/00*    (2006.01)
(52) U.S. Cl. .................... 30/228; 30/247
(58) Field of Classification Search ........... 30/180, 30/210, 216, 217, 218, 219, 220, 228, 229, 30/247
See application file for complete search history.

(56) References Cited

U.S. PATENT DOCUMENTS

| | | | | |
|---|---|---|---|---|
| 596,546 A | * | 1/1898 | Runyan | 30/258 |
| 3,654,700 A | * | 4/1972 | Pawloski | 30/247 |
| 3,808,682 A | * | 5/1974 | Sumida | 30/228 |
| 4,109,381 A | * | 8/1978 | Pellenc | 30/228 |
| 4,173,069 A | * | 11/1979 | Sidenstick et al. | 30/228 |
| 4,682,416 A | * | 7/1987 | Stolfa | 30/228 |
| 5,566,454 A | * | 10/1996 | Eisenbraun | 30/228 |

FOREIGN PATENT DOCUMENTS

| | | |
|---|---|---|
| DE | 1182 024 | 11/1964 |
| DE | 298 04 012 | 5/1998 |

OTHER PUBLICATIONS

Photo of products of Sanwa, date of photo unknown, products were known to inventors prior to the date of invention, prior to Jul. 2003.

* cited by examiner

*Primary Examiner*—Hwei-Siu C. Payer
(74) *Attorney, Agent, or Firm*—Fish & Richardson P.C.

(57) ABSTRACT

A hand-operated machine tool includes a movable lever having a cutting portion and a driving portion, a stroke drive comprising a rotating stroke eccentric driven about a rotation axis, the stroke drive operable with the driving portion to reciprocate the cutting portion between end positions, a cam carrier comprising an adjusting cam disposed between the stroke eccentric and the driving portion and operable to move together therewith, the adjusting cam comprising a pitched portion, and a retaining stop configured to engage the cam carrier and move between a released position and an active position. When the retaining stop is moved to the released position, the cam carrier engages and drives the stroke eccentric. When the retaining stop is moved to the active position, the cam carrier disengages the stroke eccentric, thereby adjusting the end positions of the movable lever.

18 Claims, 10 Drawing Sheets

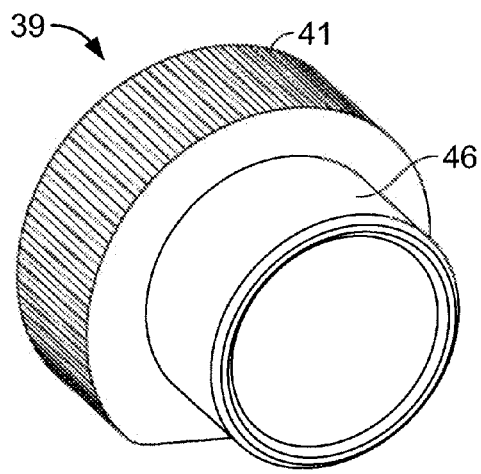
FIG. 4.1
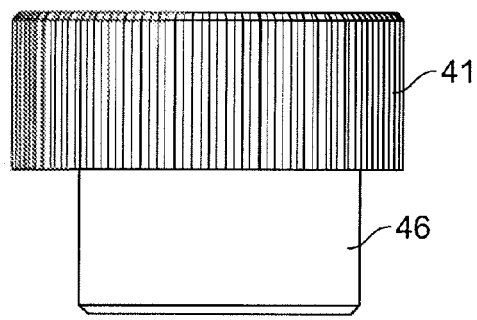
FIG. 4.3
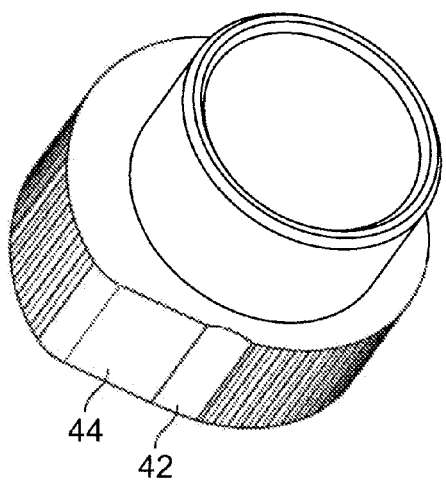
FIG. 4.2
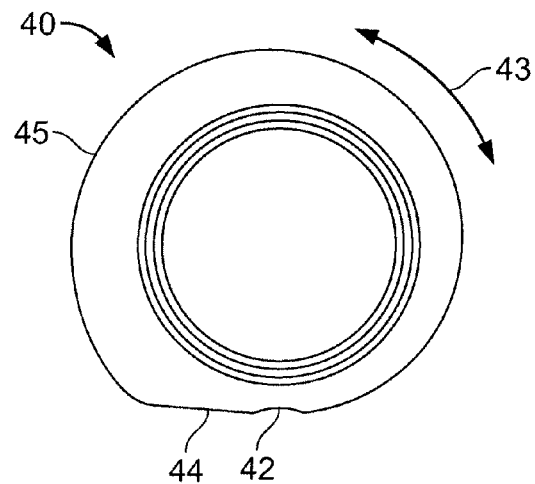
FIG. 4.4

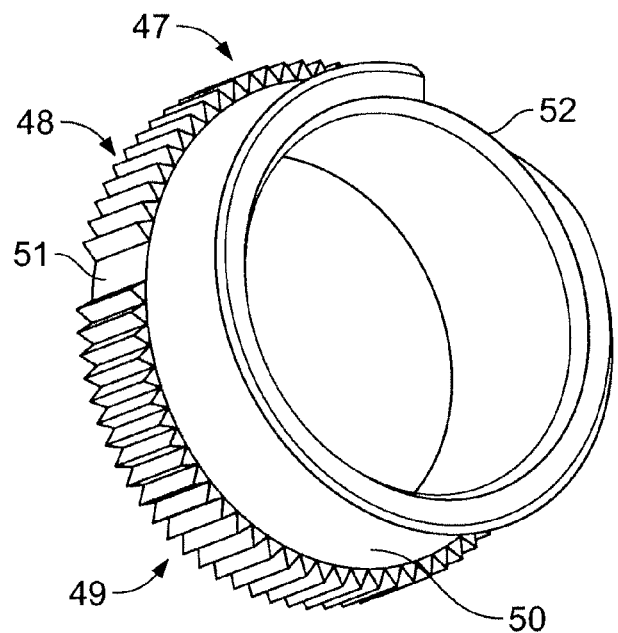
FIG. 5.1
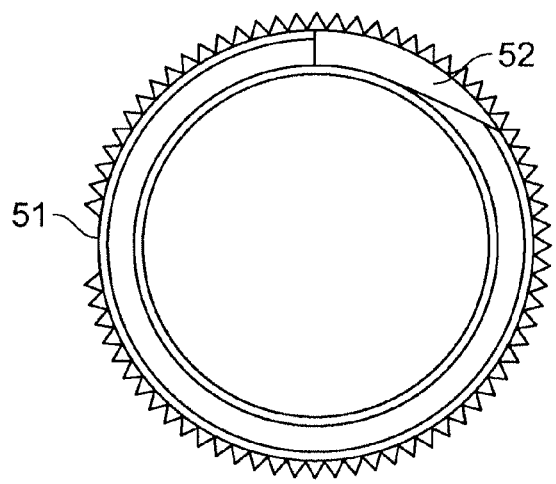
FIG. 5.2
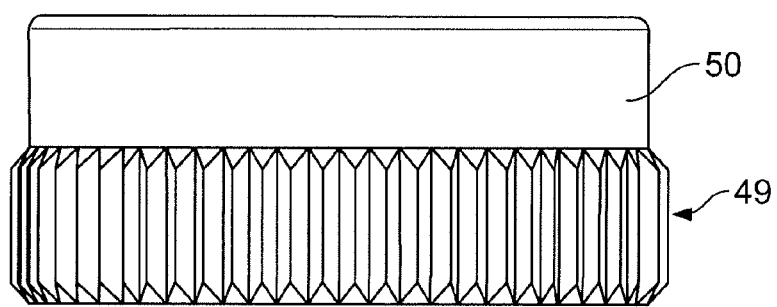
FIG. 5.3

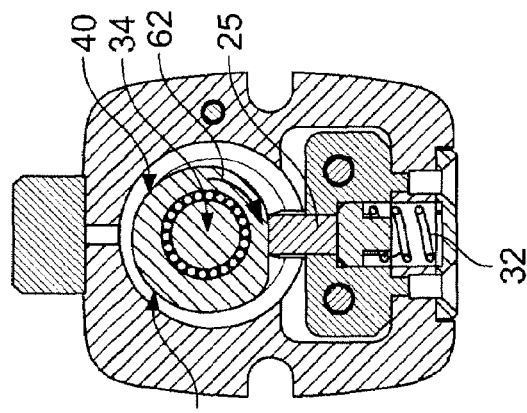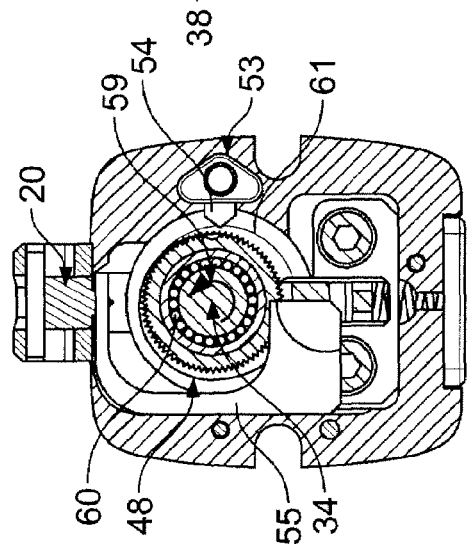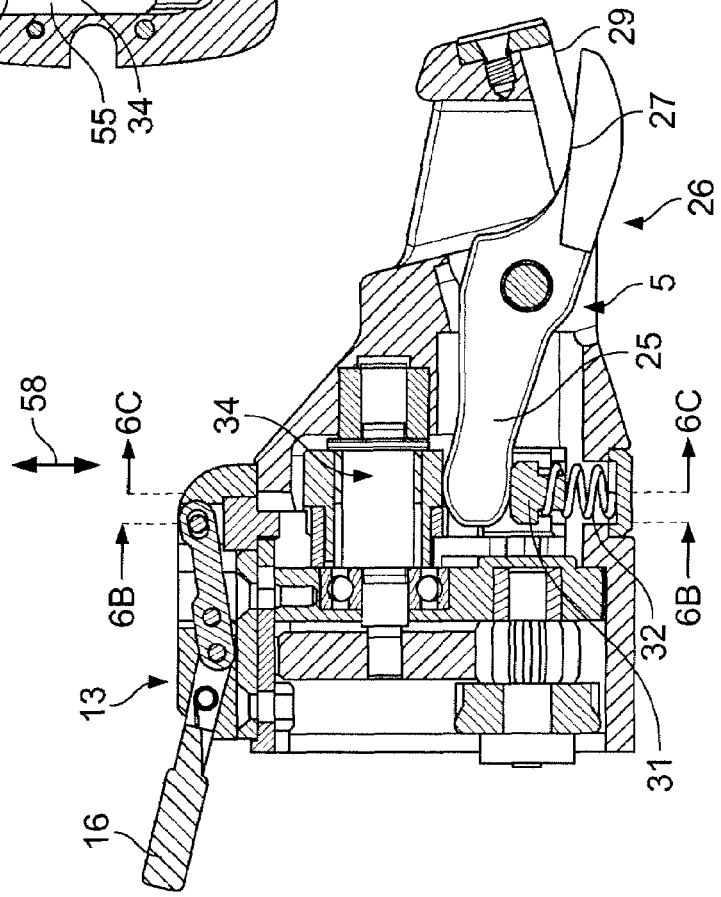

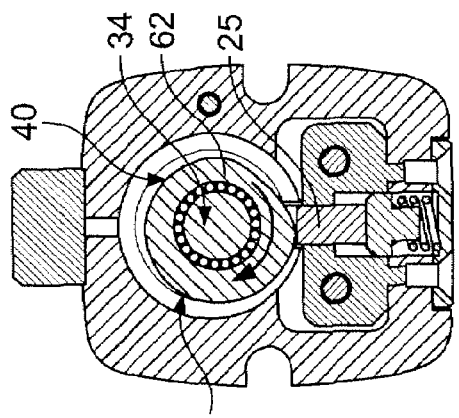
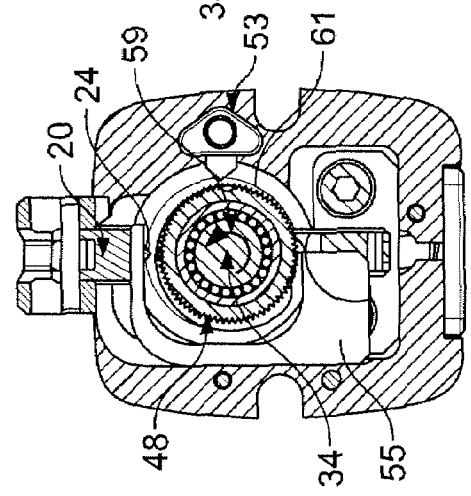
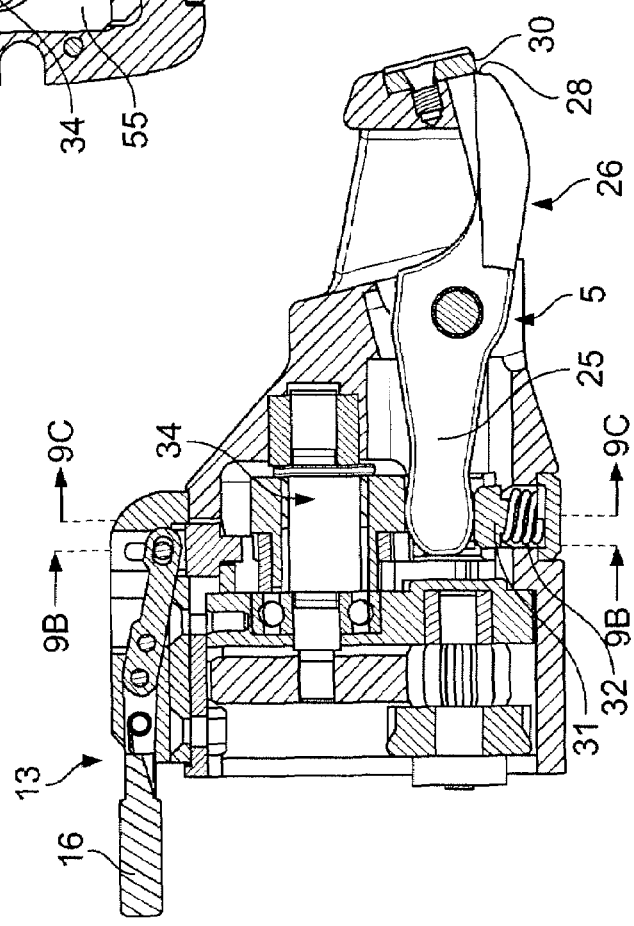
FIG. 9C
FIG. 9B
FIG. 9A

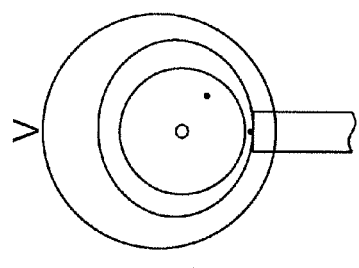
FIG. 10.1
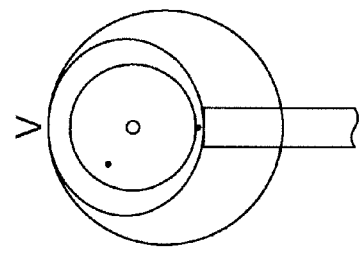
FIG. 10.2
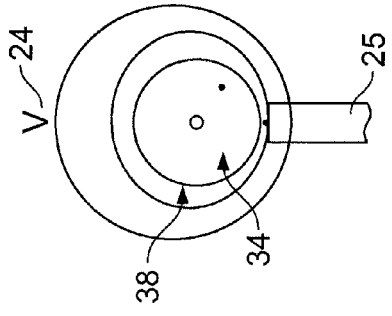
FIG. 10.3
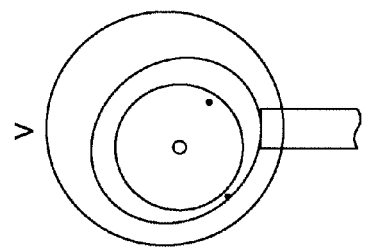
FIG. 11.1
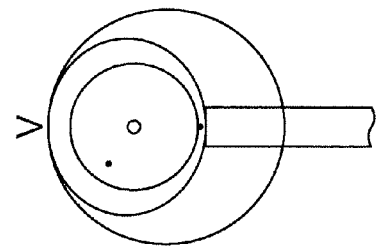
FIG. 11.2
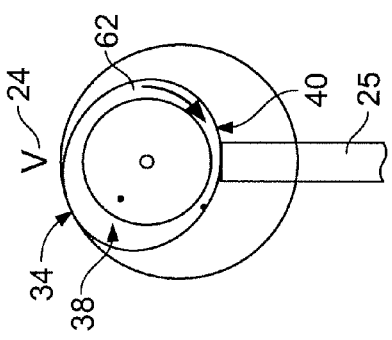
FIG. 11.3
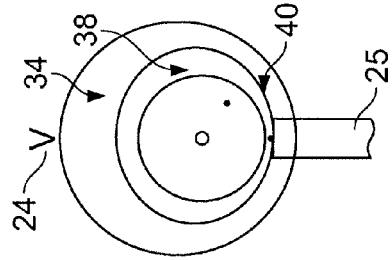
FIG. 11.4

RECIPROCATING MACHINE TOOL

CROSS-REFERENCE TO RELATED APPLICATIONS

This application is a continuation of PCT application PCT/EP 2004/007460, filed on Jul. 8, 2004, which claims priority to European Patent Application No. 03 017 222.5, filed on Jul. 30, 2003.

TECHNICAL FIELD

This description relates to a hand-operated machine tools for machining workpieces, such as slitting shears for metal sheets and the like.

BACKGROUND

German Application No. DE 298 04 012 U1 discloses a slitting shear with a two-armed cutting lever. This is pivotable about a cutting-lever axis, and an eccentric of a mechanical tool drive acts on one lever arm. On the other lever arm, the cutting lever is provided with blades for machining sheet metal. Two of these blades extend as longitudinal blades in the feed direction of the known slitting shear. A third blade extends as a transverse blade in the transverse direction of the longitudinal blades. Complementary counterblades on the tool housing are associated with the longitudinal blades and the transverse blade of the cutting lever. The cutting-lever axis is vertically adjustable. Depending upon the height of the cutting-lever axis, either only the longitudinal blades of the cutting lever pass the associated counterblades on the tool housing or, in addition to the longitudinal blades, the transverse blade of the cutting lever also passes the associated counterblade on the housing. When a metal sheet is cut, in the first-mentioned case a continuous metal strip is cut away as the slitting shear moves in the feed direction. If, owing to corresponding adjustment of the cutting-lever axis, the transverse blade of the cutting lever also passes the associated counterblade, the metal strip, which has previously been cut away, is clipped off.

To adjust the height of the cutting-lever axis and, therefore, to adjust the movement end positions of the bladed cutting-lever arm, the known slitting shear utilizes a threaded adjusting drive, which is manually actuated by the machine operator by means of a hand crank.

SUMMARY

According to one aspect, a hand-operated machine tool includes a movable lever having a cutting portion and a driving portion, a stroke drive comprising a rotating stroke eccentric driven about a rotation axis, the stroke drive operable with the driving portion to reciprocate the cutting portion between end positions, a cam carrier comprising an adjusting cam disposed between the stroke eccentric and the driving portion and operable to move together therewith, the adjusting cam comprising a pitched portion, and a retaining stop configured to engage the cam carrier and move between a released position and an active position. Upon movement of the retaining stop to the released position, the cam carrier engages and drives the stroke eccentric, and upon movement of the retaining stop to the active position, the cam carrier disengages the stroke eccentric, thereby adjusting the end positions of the movable lever.

According to another aspect, a hand-operated machine tool includes an electric motor, a fixed cutter comprising a fixed longitudinal blade surface and a fixed transverse blade surface, and a movable cutter positionable a distance from the fixed cutter along a stroke length and comprising a movable longitudinal blade surface and a movable transverse blade surface, the movable cutter operably connected to the electric motor for reciprocation. The stroke length is adjustable to selectively engage the fixed transverse blade surface and the movable transverse blade surface and completely cut a material positioned between the fixed and movable blades.

In some embodiments, the machine tool also includes a stroke length control having a first operation state wherein only the fixed longitudinal and movable longitudinal blade surfaces pass each other and also having a second operation state wherein both the fixed longitudinal and movable longitudinal blade surfaces pass each other and the fixed transverse and movable transverse blade surfaces pass each other.

In some embodiments, the stroke length control includes a stroke drive including a rotating stroke eccentric driven about a rotation axis, the stroke drive operable to reciprocate the movable cutter. The stroke length control can be manually actuated by an operator.

In some embodiments, the machine tool includes a cam carrier comprising an adjusting cam disposed between the stroke eccentric and the driving portion and operable to move together therewith, the adjusting cam comprising a pitched portion and a retaining stop configured to engage the cam carrier and move between a released position and an active position. Upon movement of the retaining stop to the released position, the cam carrier engages and drives the stroke eccentric, and upon movement of the retaining stop to the active position, the cam carrier disengages the stroke eccentric, thereby adjusting the end positions of the movable lever.

In various embodiments, the movement executed by the tool-side driving member in the stroke direction is converted into a working movement of the machining tool, the position of the tool-side driving member in the stroke direction determines the position of the machining tool in the direction of its working movement. The aforementioned position of the tool-side driving member and thus also the aforementioned position of the machining tool is variable by the cam carrier, specifically by the adjusting cam provided on it. Owing to the pitch of the adjusting cam, the position of the tool-side driving member changes with the movement of the adjusting cam into the space between the stroke eccentric and the tool-side driving member. According to one embodiment, this movement is produced by means of the rotating stroke eccentric and therefore without the machine operator having to carry out a corresponding adjusting movement. Before movement of the adjusting cam into the space between the stroke eccentric and the tool-side driving member, retaining stop is released provided for the cam carrier. At most, the operator has to release the retaining stop for the cam carrier. The machine operator can therefore substantially concentrate on advantageous alignment and guiding of the hand-operated tool throughout the entire process of machining the workpiece. Correspondingly high-quality machining results can be achieved with the hand-operated tool.

In some embodiments, the cam carrier is directly connected to the stroke eccentric to ensure that the cam carrier is driven by the stroke eccentric in a functionally reliable manner.

In some embodiments, the retaining stop for the cam carrier is released via the cam carrier itself. Accordingly, in the interests of a structurally simple and small tool drive, a part which is functionally necessary for adjustment of the movement end positions is itself used for releasing the retaining stop.

In some embodiments the stroke eccentric has a plurality of functions. On the one hand, it serves to drive the machining tool. Furthermore, it drives the cam carrier for adjusting the movement end position of the machining tool. Lastly, the stroke eccentric at least makes a contribution towards releasing the retaining stop for the cam carrier, thereby first enabling the cam carrier to be driven.

In some embodiments a deflection device for the cam carrier effects the release of the retaining stop provided for the cam carrier and the movement of the adjusting cam into the space between the stroke eccentric and the tool-side driving member.

In some embodiments, the pitch of the adjusting cam on the cam carrier is selected so that the height of the cam carrier between the stroke eccentric and the tool-side driving member adopts its starting value again after at least two deflections of the cam carrier. Consequently, the starting conditions are produced again after at least two adjusting processes. After the adjusting device has been activated at least twice, the movement end position of the machining tool again corresponds to the initial movement end position. The described embodiments can be applied to a slitting shears implementation. Initially, the movement end position of the bladed arm of the cutting lever can be set so that only the longitudinal blades of the cutting lever co-operate with the longitudinal counterblades on the machine housing and thereby cut away a continuous metal strip. By adjusting the cam carrier or the adjusting cam one or more times, a movement end position for the cutting tool can then be defined in which the transverse blade of the cutting tool clips off the metal strip, which has previously been cut away, in co-operation with the associated counterblade on the housing. After one or more further adjustments, the starting state is then produced in which a continuous metal strip is cut away again.

In some embodiments, the hand-operated tool includes a deflection device for the cam carrier, by means of which deflection device the cam carrier is deflectable so that it is accessible for subsequent deflection. Should the machine operator adjust the movement end position of the machining tool and if at least one subsequent deflection is automatically effected, the machine operator can limit himself to triggering the adjustment process on the basis of the above inventive features. The operator only has to ensure one deflection of the cam carrier. The following deflection or deflections of the cam carrier can then be carried out without the operator having to take any action in this respect.

According to various embodiments, the deflection of the cam carrier can take place in different ways. The hand-operable machine tool can include a catching device to block the cam carrier moving with the stroke eccentric and the tool-side driving member, preferably in a positive-locking manner. In the case of one embodiment of the invention, it is to be actuated manually by the operator.

In some embodiments, the rotating stroke eccentric forms part of the deflection device and co-operates as such with the catching device for deflection of the cam carrier.

In some embodiments, the hand-operated tool includes structurally simple means for ensuring defined movement of the cam carrier during its adjustment. The stroke eccentric itself serves as a guide for the cam carrier.

In some embodiments, the machine tool comprising at least one catching device comprising a plurality of positive-locking recesses formed by tooth spaces in teeth circumferentially arranged around the cam carrier. The plurality of tooth spaces ensures that the positive-locking projection of the catching device can be brought into engagement with a tooth space at any time and, as a result, the catching device can be activated.

In some embodiments, a retaining stop is provided which, during continuous operation of the hand-operated tool, ensures that the machine setting for the movement end positions of the machining tool is effectively secured. In spite of this, the retaining stop for adjusting the movement end positions is releasable in a simple manner.

In a particular compact embodiments, the thrust member of the retaining stop for the cam carrier can be formed by the tool-side driving member.

In some embodiments, the hand-operated tool is configured for slitting metal sheets, for example, which can be set in a simple and operator-friendly manner, to a continuous operating state for cutting away a continuous material strip or to an operating state in which the previously produced material strip is clipped off. The tool according to this embodiment can be applied to hand-operated machine tools of a wide variety of types.

The details of one or more embodiments are set forth in the accompanying drawings and the description below. Other features and advantages will be apparent from the description and drawings, and from the claims.

DESCRIPTION OF DRAWINGS

FIGS. 4.1-4.4 show different views of the part of the cam carrier, according to FIG. 3, provided with the adjusting cam;

FIGS. 5.1-5.3 show different views of the part of the cam carrier, according to FIG. 3, provided with the external teeth;

FIGS. 6A-6C and 7A-7C each show three individual views illustrating the method of operation of the hand-operated slitting shear according to FIGS. 1 to 5C for cutting away a metal strip;

FIGS. 8A-8C and 9A-9C each show three individual views illustrating the method of operation of the hand-operated slitting shear according to FIGS. 1 to 7C for clipping off a metal strip which has previously been cut away;

FIGS. 10.1-10.3 show highly schematic individual views of the conditions in the region of the cam carrier according to FIGS. 3 to 5C during the process of cutting away a metal strip; and FIGS. 11.1-11.4 show highly schematic individual views of the conditions in the region of the cam carrier according to FIGS. 3 to 5C during the process of clipping off a metal strip which has previously been cut away.

Like reference symbols in the various drawings indicate like elements.

DETAILED DESCRIPTION

Figure 1:
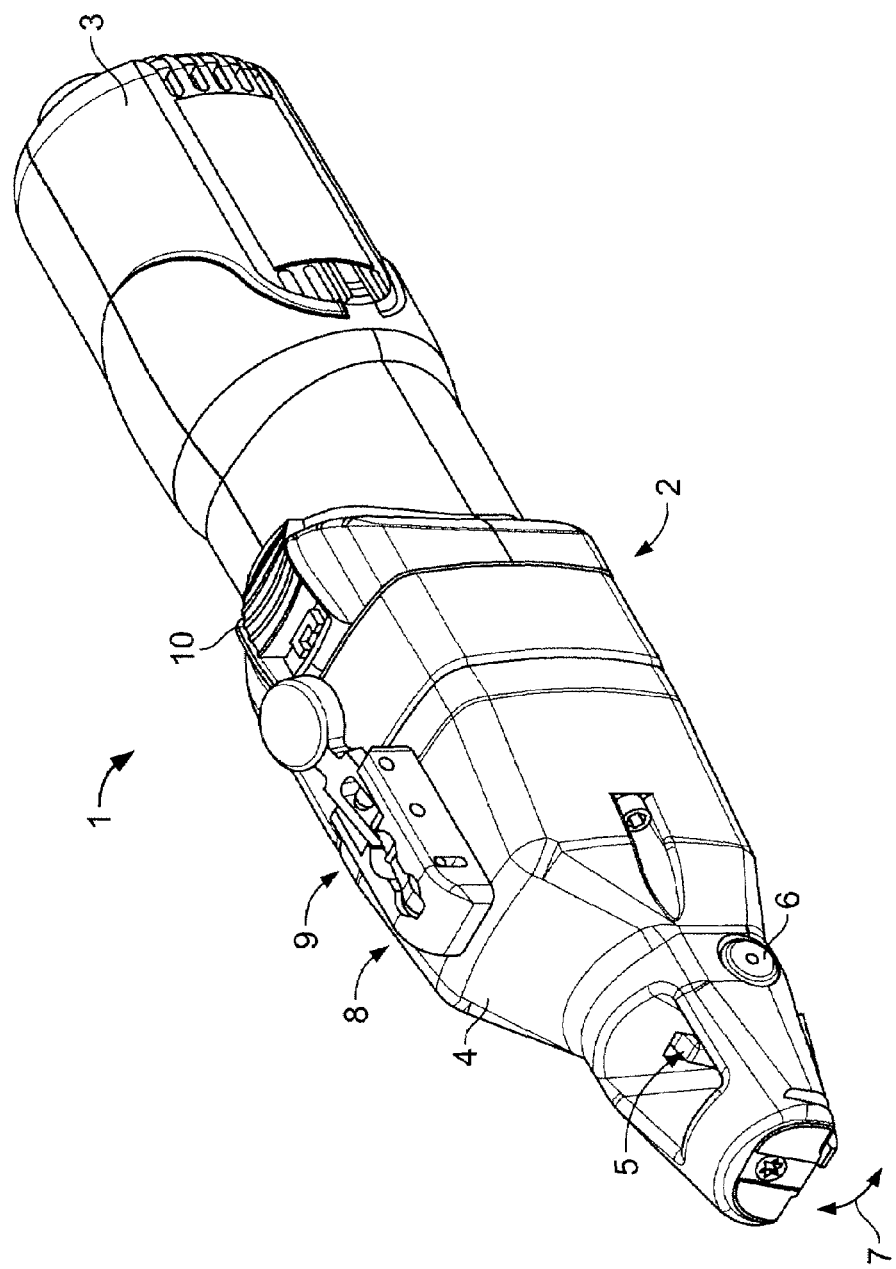
FIG. 1 shows an electric, hand-operated slitting shear for machining sheet metal, having a cutting tool with adjustable movement end positions.

As shown in FIG. 1, a hand-operated slitting shear 1 has a multipart machine housing 2. A high-performance electric motor with a motor shaft extending in the longitudinal direction of the hand-operated slitting shear 1 is accommodated in a rear housing part 3. A front housing part 4 of the machine housing 2 holds the transmission for the hand-operated slitting shear 1 and mounts a cutting lever 5 by means of a cutting-lever swivel pin 6. The cutting lever 5 is movable about the cutting-lever swivel pin 6 in the direction of a double arrow 7 and, if necessary, can be removed with little effort.

The movement end positions of the cutting lever 5 are adjustable. An adjusting device 8 with an actuating means 9, shown in FIG. 1, is provided for this purpose. The actuating means 9 is arranged in the vicinity of an on/off switch 10 of the hand-operated slitting shear 1. Like the on/off switch 10, the actuating means 9 of the adjusting device 8 can also be manually reached by the machine operator holding and guiding the hand-operated slitting shear 1 without the operator having to change his grip on the hand-operated slitting shear 1 for this purpose.

Figure 2:
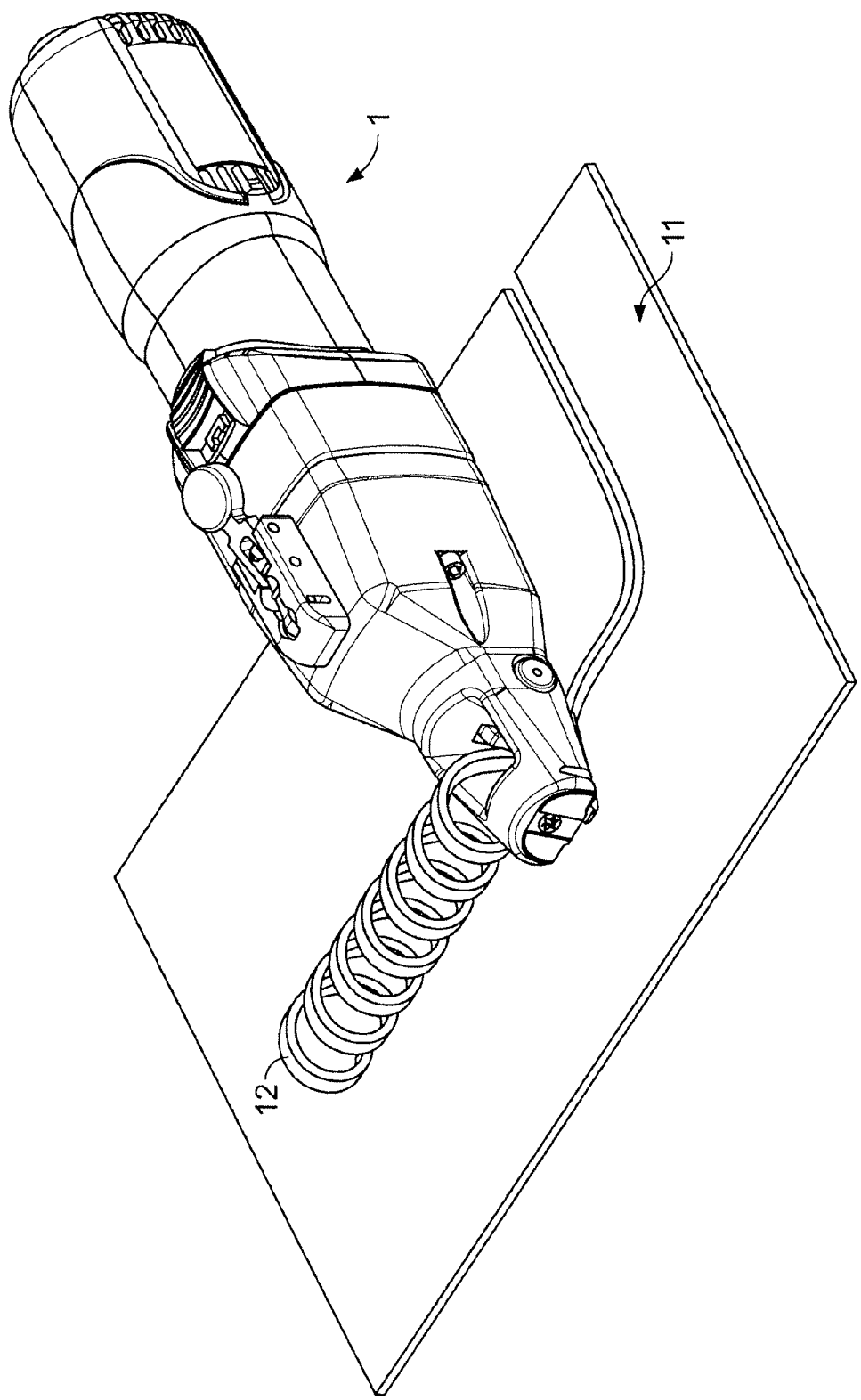
FIG. 2 shows the hand-operated slitting shear according to FIG. 1 in use on a metal sheet.

FIG. 2 shows the hand-operated slitting shear 1 in the process of slitting a metal sheet 11. As the hand-operated slitting shear 1 advances, a metal strip 12 is cut away and issues from an opening provided for this purpose in the machine housing 2. In order to avoid obstructions while the metal sheet 11 is being machined and also to avoid scratches on the surface of the metal sheet and/or to avoid injury to the machine operator caused by an excessively long metal strip 12, this has to be clipped off from time to time. The structural measures provided for this purpose on the hand-operated slitting shear 1 will be explained in detail herein below.

Figure 3:
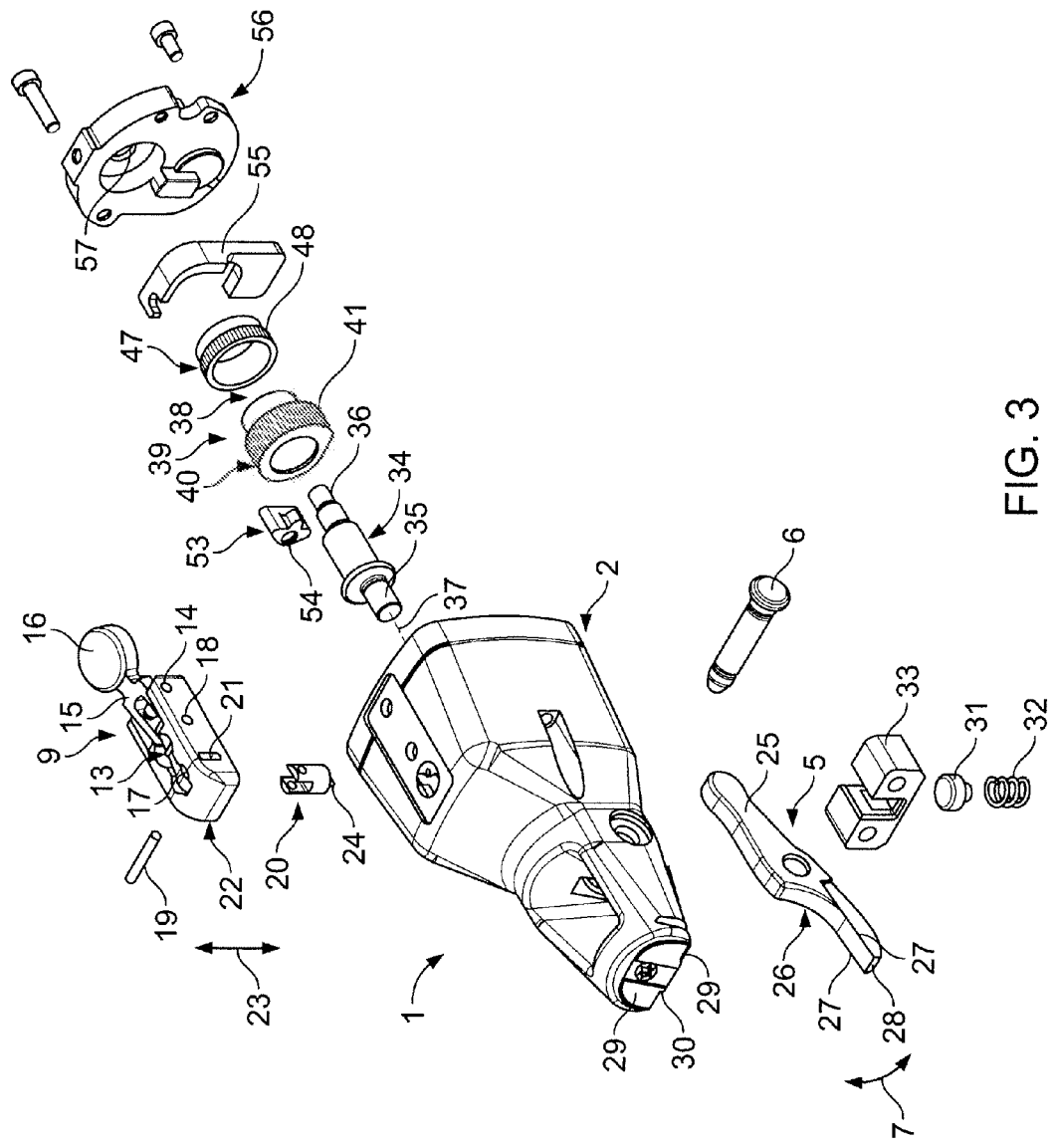
FIG. 3 shows an exploded view of the tool drive of the hand-operated slitting shear according to FIGS. 1 and 2, inter alia with a two-part cam carrier with an adjusting cam and external teeth.

As shown in FIG. 3, the actuating means 9 for adjusting the movement end positions of the cutting lever 5 comprises a lever arrangement 13. The lever arrangement 13 has an operator-side lever 15 which is pivotable about a first lever axis 14. The lever 15 is provided with a push button 16 at one end and articulated on a tool-side lever 17 at its other end. The tool-side lever 17 is pivotable about a second lever axis 18 and is articulated on a first control member 20 by means of a pivot pin 19 at its end remote from the operator-side lever 15. The pivot pin 19 is guided in slots 21 of a holder 22 for the lever arrangement 13 in the direction of a double arrow 23.

The first control member 20 is movable with the pivot pin 19 in the direction of the double arrow 23. On its underside remote from the pivot pin 19, the first control member 20 has a tooth-shaped projection 24.

The cutting lever 5 has a driving arm 25 acting as a tool-side driving member and, on the opposite side of the cutting-lever swivel pin 6, a cutting arm 26. The latter forms the cutting tool of the hand-operated slitting shear 1 and is provided for this purpose with two longitudinal blades 27 extending in the feed direction of the hand-operated slitting shear 1 and with a transverse blade 28 which connects the longitudinal blades 27 to one another at the free end of the cutting arm 26. On the front housing part 4, two complementary longitudinal counterblades 29 are associated with the longitudinal blades 27 of the cutting arm 26. A transverse counterblade 30 is provided on the front housing part 4 of the machine housing 2 as a counterpart to the transverse blade 28.

The underside of the driving arm 25 of the cutting lever 5 is acted upon by a strong helical spring 32 via a thrust piece 31. The helical spring 32 is supported on the front housing part 4 of the machine housing 2 via an abutment 33 fixed to the housing.

The pivoting movement of the cutting lever 5, which is necessary to cut the workpiece, is generated by means of a stroke drive. In addition to the electric motor, which is not shown in FIG. 3, the stroke drive comprises a stroke eccentric 34 rotatably mounted on journals 35, 36. The journals 35, 36 define a rotation axis 37 of the stroke eccentric 34, about which the stroke eccentric 34 rotates. The driving arm 25 of the cutting lever 5 is moved downwards in a stroke direction by means of the rotating stroke eccentric 34. This movement of the driving arm 25 takes place against a restoring force which is exerted by the helical spring 32 and which, after each downwards stroke of the driving arm 25, generates an upwards stroke in the stroke direction.

In the mounted state, the stroke eccentric 34 is held within a two-part cam carrier 38 between the journals 35, 36. An adjusting cam 40 is formed on a first part 39 of the cam carrier 38 and has a roughening 41 on its outer surface in order to increase friction.

The first part 39 of the cam carrier 38, provided with the adjusting cam 40, is shown in detail in the individual views in FIGS. 4.1-4.4. Accordingly, the adjusting cam 40 has a depression 42 adjoined on one side by a substantially linear cam part 44, seen in a circumferential direction 43. The pitch of the linear cam part 44 is relatively great. A substantially coil-shaped cam part 45 with a relatively small pitch extends on the side of the depression 42 opposite the linear cam part 44.

A radially narrowed, sleeve-type axial portion 46 adjoins the axial portion—provided with the adjusting cam 40—of the first part 39 of the cam carrier 38. The axial portion 46 carries a second part 47 (FIG. 3) of the cam carrier 38. The second part 47 of the cam carrier 38 is fixedly connected to the first part 39. As an alternative to the illustrated two-part arrangement of the cam carrier 38, a one-piece formation would also be possible.

The second part 47 of the cam carrier 38 is shown in detail in FIGS. 5.1-5.3. It has an axial portion 49, provided with knurling-type outer teeth 48, and a smooth-walled axial portion 50. The knurling-type teeth 48 on the axial portion 49 has a tooth space 51, and the smooth-walled axial portion 50 has a wedge-shaped recess 52.

The cam carrier 38 with its parts 39, 47 is part of the adjusting device 8 (FIGS. 11.1-11.4) for adjusting the movement end positions of the cutting lever 5. A second control member 53 with a projection 54 and a detent 55 are shown in FIG. 3 as further components of the adjusting device 8. The detent 55 is guided on a rear wall 56 of the front housing part 4 in the direction of the double arrow 23. In addition, the rear wall 56 mounts the journal 36 of the stroke eccentric 34 by means of a bearing eye 57.

The method of operation of the hand-operated slitting shear 1 will be explained in detail with the aid of FIGS. 6A to 9C and with reference to FIGS. 10.1-10.3 and 11.1-11.4.

FIGS. 6A-6C and 7A-7C show the hand-operated slitting shear 1 during a normal cutting operation, i.e. in the operating state in which the cutting lever 5 cuts a continuous metal strip 12 from the metal sheet 11. FIGS. 8A-8C and 9A-9C show the conditions for clipping off the metal strip 12 which has previously been cut away.

Figure 7C:
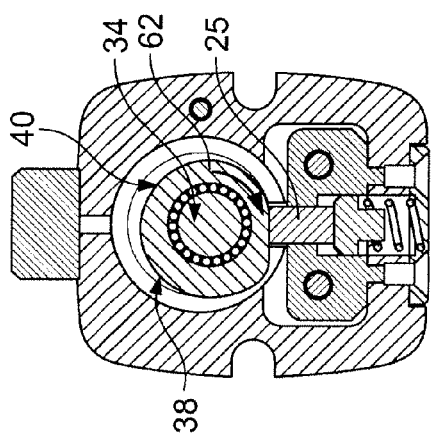
Figure 7B:
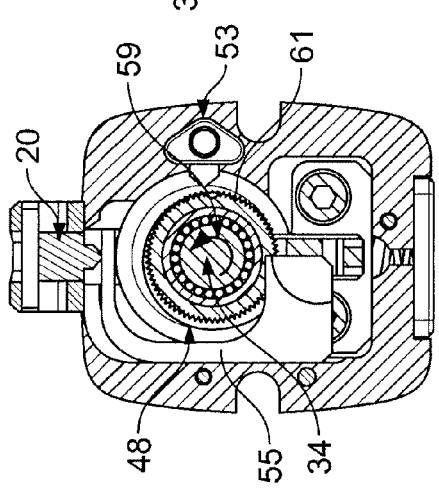
Figure 7A:
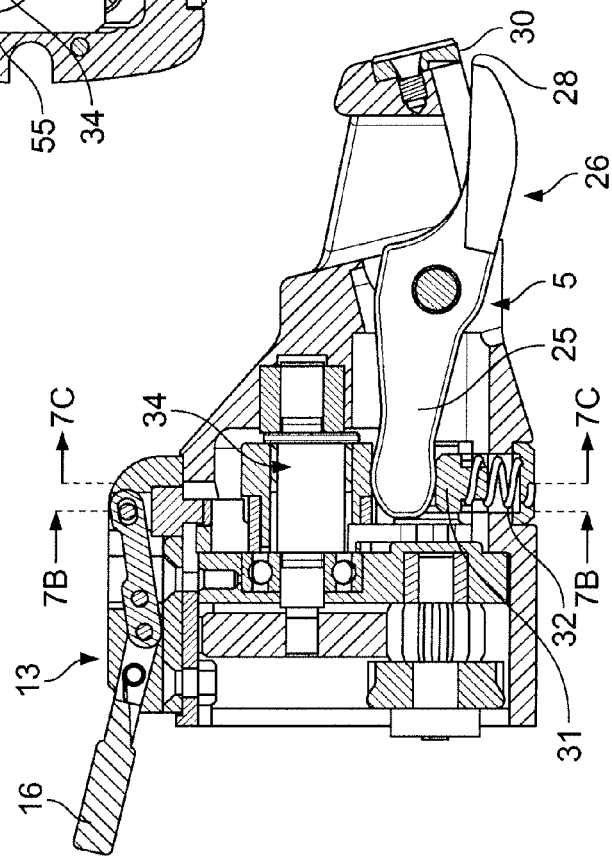

In FIGS. 6A-6C, the driving arm 25 of the cutting lever 5 is in its upper end position during a normal cutting operation. Therefore, the cutting arm 26 of the cutting lever 5 is in its lower end position in FIGS. 6A-6C during a normal cutting operation. In contrast, FIGS. 7A-7C show the driving arm 25 of the cutting lever 5 in its lower end position and the cutting arm 26 of the cutting lever 5 in its upper end position during a normal cutting operation.

The cutting lever 5 is moved in a reciprocating manner between the upper and the lower end positions in a stroke direction 58 by means of the stroke eccentric 34. In the stroke direction 58, the stroke eccentric 34 and the driving arm 25 of the cutting lever 5 are supported against one another via the cam carrier 38, specifically via the adjusting cam 40. As shown in the FIGS. 6C and 7C, the adjusting cam 40 of the cam carrier 38 rests against the driving arm 25 of the cutting lever 5 in the region of the depression 42.

The cam carrier 38 moves together with the driving arm 25 of the cutting lever 5. In spite of the "unround" path of movement of the stroke eccentric 34, the point of support of the cam carrier 38 on the driving arm 25 does not change its position on the driving arm 25 during the movement of the cam carrier 38. This is achieved on the one hand by the detent 55, which engages in the wedge-shaped recess 52 in the cam carrier 38. In addition, the helical spring 32 exerts a quantitatively great perpendicular force on the cam carrier 38 via the thrust piece 31 and the driving arm 25 of the cutting lever 5. A great frictional force holding the cam carrier 38 on the driving arm 25 results from this perpendicular force, not least owing to the roughening 41 on the surface of the adjusting cam 40. Accordingly, the detent 55 and the spring-loaded driving arm 25 form a retaining stop for the cam carrier 38. Furthermore, there is a positive connection between the driving arm 25 of the cutting lever S and the depression 42 in the adjusting cam 40. Moreover, the friction between the inner wall of the cam carrier 38 and the stroke eccentric 34 is substantially reduced by means of a needle bearing 60, which can be seen in FIGS. 6A to 9C.

All in all, driving of the cam carrier 38 by the stroke eccentric 34, with rotation of the cam carrier 38 into the space between the eccentric disc 34 and the driving arm 25, is prevented. A path of movement 61, which is described by the knurling-type teeth 48 on the cam carrier 38 during a normal cutting operation and associated stroke movements, is shown in the middle sectional views in FIGS. 6A-6C, 7A-7C, 8A-8C, 9A-9C. The conditions resulting in the region in which the cam carrier 38 is supported on the driving arm 25 during a normal cutting operation are highly schematically shown in FIGS. 10.1-10.3.

As shown in FIGS. 7A-7C, there is an upper movement end position or a top dead centre position for the cutting arm 26 of the cutting lever 5, in which position only the longitudinal blades 27 on the cutting arm 26 and the longitudinal counterblades 29 on the machine housing 2, but not the transverse blade 28 on the cutting arm 26 and the transverse counterblade 30 on the housing, co-operate with one another.

If, starting from the operating state of the hand-operated slitting shear 1 as shown in FIGS. 6A-6C and 7A-7C, the metal strip 12 produced during this operating state is to be clipped off, the push button 16 of the adjusting device 8 has to be depressed into the position shown in FIGS. 8A-8C and 9A-9C by the operator of the hand-operated slitting shear 1. This movement of the push button 16 effects displacement of the first control member 20 downwards in the figures via the lever arrangement 13. In the same direction as the first control member 20, the detent 55 is displaced against the action of a spring force. As a result, the detent 55 moves out of the wedge-shaped recess 52 in the smooth-walled axial portion 50 of the cam carrier 38. The cam carrier 38 initially retains its position relative to the driving arm 25 of the cutting lever 5 despite the release of the detent 55. The reason for this is the friction acting between the cam carrier 38 and the spring-loaded driving arm 25 of the cutting lever 5.

During its upwards movement with the stroke eccentric 34 and the driving arm 25, the knurling-type teeth 48 of the cam carrier 38 then comes into engagement with the now lowered tooth-shaped projection 24 on the first control member 20 (see also FIG. 11.2). The first control member 20 now acts as a catching device for the cam carrier 38, which moves together with the stroke eccentric 34 and the driving arm 25, and blocks the cam carrier 38 on its outer surface. The cam carrier 38 is subsequently deflected by the rotating eccentric disc 34 about the point at which it is blocked by the first control member 20. This deflection is achieved with overcoming the friction acting between the driving arm 25 of the cutting lever 5 and the cam carrier 38, specifically the adjusting cam 40. Consequently, the retaining stop formed for the cam carrier 38 by the driving arm 25 is released by the stroke eccentric 34.

As a result of the deflection, the adjusting cam 40 moves counter to a direction of rotation 59 of the stroke eccentric 34 in a movement direction 62 into the space between the eccentric disc 34 and the driving arm 25 of the cutting lever 5 (see also FIG. 11.3). Owing to the pitch of the adjusting cam 40, the height of the cam carrier 38 between the stroke eccentric 34 and the driving arm 25 increases as the adjusting cam 40 moves between these two parts (see also FIG. 11.4).

After the deflection of the cam carrier 38 as a result of the engagement of the first control member 20 in the knurling-type teeth 48, the cam carrier 38 is supported on the driving arm 25 of the cutting lever 5 in a position in which, after the first control member 20, the projection 54 of the second control member 53 now also engages in the knurling-type teeth 48 on the cam carrier 38. Previously, the knurling-type teeth 48 was still circumferentially aligned so that it came to lie with the tooth space 51 at the level of the projection 54 of the second control member 53 on passing the second control member 53 during the executed strokes, as a result of which the projection 54 could not engage in the knurling-type teeth 48. The second control member 53 is not shown in FIGS. 11.1-11.4 in order to simplify the drawing.

The second control member 53 also forms a catching device for the cam carrier 38 and, as such, also blocks the cam carrier 38 on its outer surface. This blocking also leads to deflection of the cam carrier 38 by the action of the rotating stroke eccentric 34 and, associated therewith, to continued movement of the adjusting cam 40 in its direction of movement 62.

If, during the upwards stroke of the cam carrier 38 that follows the downwards stroke after the first engagement of the first control member 20 in the knurling-type teeth 48, the first control member 20 is still in its lowered position, the first control member 20 causes further deflection of the cam carrier 38 and therefore further movement of the adjusting cam 40 into the space between the stroke eccentric 34 and the driving arm 25 of the cutting lever 5.

If the operator of the hand-operated slitting shear 1 releases the push button 16 immediately after the first engagement of the first control member 20 in the knurling-type teeth 48, the first control member 20 automatically moves back into its starting position. This return movement of the first control member 20 is effected by a restoring spring provided for this purpose on the lever arrangement 13. In this case, after the first and then also only engagement of the first control member 20 in the knurling-type teeth 48, further deflection of the cam carrier 38 is brought about solely by the second control member 53.

In both cases, the adjusting cam 40 moves further and further into the space between the stroke eccentric 34 and the driving arm 25 of the cutting lever 5. Associated with this is a continuous increase in the height of the cam carrier 38 between the stroke eccentric 34 and the driving arm 25. This in turn results in downwards displacement of the top and bottom dead centre position of the driving arm 25 of the cutting lever 5. This goes hand in hand with displacement, in the opposite direction, of the top and bottom dead centre position of the cutting arm 26 on the cutting lever 5. Consequently, the cutting arm 26 of the cutting lever 5 moves back and forth between the end positions shown in FIGS. 8A-8C and 9A-9C. In its upper movement end position shown in FIGS. 9A-9C, the transverse blade 28 on the cutting arm 26 co-operates with the transverse counter-blade 30 on the machine housing 2. As a result, the previously produced metal strip 12 is clipped off. An increase in the number of catching devices for the cam carrier 38 would result in faster adjustment of the movement end positions.

Figure 8C:
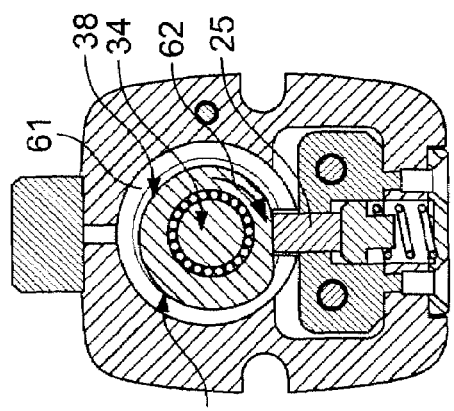
Figure 8B:
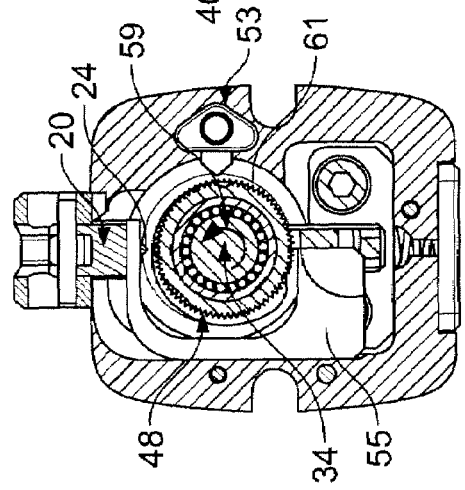
Figure 8A:
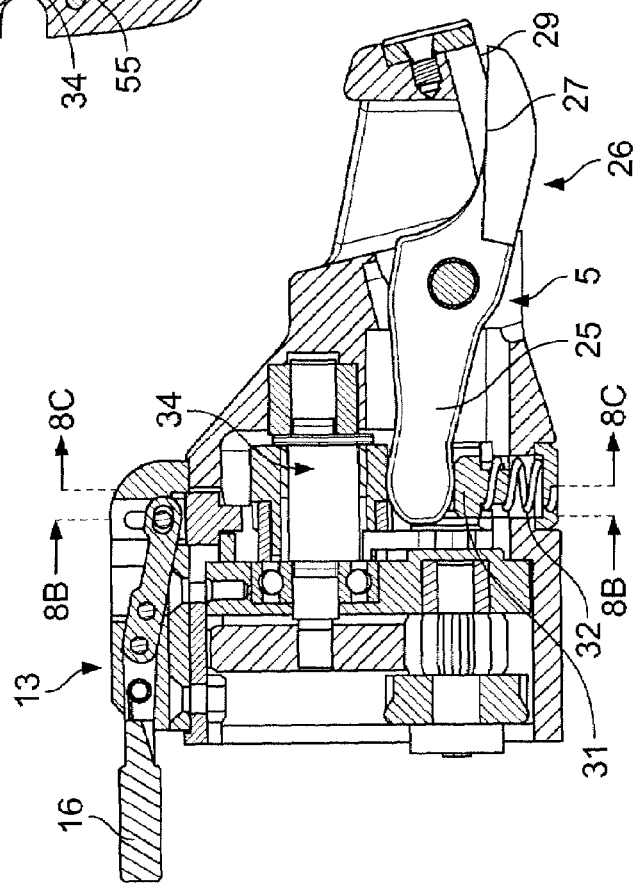

The right-hand sectional view in FIGS. 8A-8C shows the cam carrier 38 before its first deflection by the first control member 20. In FIGS. 9A-9C, the cam carrier 38 is shown in the position associated with the maximum end position displacement of the cutting lever 5. Further deflection of the cam carrier 38, starting from the conditions shown in FIGS. 9A-9C, transfers the cam carrier 38 to its starting position before the start of the adjustment of the movement end positions. In this starting position, the tooth space 51 in the knurling-type teeth 48 on the cam carrier 38 then again lies opposite the projection 54 on passing the projection 54 of the second control member 53. Further deflection of the cam carrier 38 by the second control member 53 is therefore not possible. If, furthermore, the first control member 20 is also transferred to its retracted starting position, the hand-operated slitting shear 1 can again work in a normal cutting operation and again cut away a continuous metal strip 12.

The transfer of the cam carrier 38 from a position according to FIGS. 9A-9C to the starting position according to FIGS. 6A-6C and 7A-7C is assisted by the helical spring 32 and the shape of the adjusting cam 40. The helical spring 32 exerts a force on the adjusting cam 40 via the driving arm 25. This force acts upon the linear cam part 44 of the adjusting cam 40 of the cam carrier 38 and thereby produces displacement of the cam carrier 38 in spite of the friction between the adjusting cam 40 and the driving arm 25, the linear cam part 44, according to FIGS. 9A-9C, lying relatively steeply.

The detent 55 moves back into its locking position on the smooth-walled axial portion 50 of the cam carrier 38 after complete rotation of the cam carrier 38 under the effect of the restoring force acting upon it and then engages again in the wedge-shaped recess 52 in the cam carrier 38.

A number of embodiments of have been described. Nevertheless, it will be understood that various modifications may be made without departing from the spirit and scope of the invention. Accordingly, other embodiments are within the scope of the following claims.

What is claimed is:

1. A hand-operated machine tool for machining workpieces, the tool comprising:
    a machining tool and a stroke drive therefore;
    a rotating stroke eccentric driven about a rotation axis, wherein the stroke eccentric, via its outer surface extending in the direction of the rotation axis, and a tool-side driving member are supported against one another in a stroke direction extending transversely to the rotation axis, and the tool-side driving member is driven by the stroke eccentric in the stroke direction to execute a movement which can be converted into a working movement of the machining tool with adjustable movement end positions;
    a cam carrier with an adjusting cam provided between the stroke eccentric and the tool-side driving member and movable together therewith, the stroke eccentric and the tool-side driving member being supported against one another in the stroke direction via the adjusting cam; and
    a retaining stop, configured to be releasable for adjustment of the movement end position of the machining tool, provided for the cam carrier,
        wherein the cam carrier is drivable by the rotating stroke eccentric when the retaining stop is released, with movement of the adjusting cam into a space between the stroke eccentric and the tool-side driving member, wherein the cam carrier is locked against being driven when the retaining stop is active, and wherein the adjusting cam has a pitch in its direction of movement.

2. The machine tool according to claim 1, wherein the cam carrier is directly connected to the stroke eccentric.

3. The machine tool according to claim 1, wherein the cam carrier is configured to release the retaining stop.

4. The machine tool according to claim 1, wherein the rotating stroke eccentric is configured to release the retaining stop.

5. The machine tool according to claim 1, further comprising a deflection device operable to deflect the cam carrier upon releasing the retaining stop.

6. The machine tool according to claim 5, wherein the pitch of the adjusting cam is configured so that a height of the cam carrier between the stroke eccentric and the tool-side driving member after at least two deflections of the cam carrier has a height in the direction of the mutual support between the cam carrier and the tool-side driving member substantially similar to the height of the cam carrier before the at least two deflections.

7. The machine tool according to claim 5, wherein the deflection device is configured to deflect the cam carrier such that the cam carrier is accessible for subsequent deflection.

8. The machine tool according to claim 7, wherein the deflection device comprises at least one catching device configured to release the retaining stop and to block the cam carrier moving with the tool-side driving member, and wherein the adjusting cam is movable into the space between the stroke eccentric and the tool-side driving member.

9. The machine tool according to claim 8, wherein the at least one catching device further comprises a positive-locking projection configured to engage at least one positive-locking recess disposed in the cam carrier.

10. The machine tool according to claim 8, wherein the at least one catching device is controllable by a manual actuating member.

11. The machine tool according to claim 8, wherein the rotating stroke eccentric forms part of the deflection device and the blocked cam carrier is configured to be deflected by the rotating stroke eccentric.

12. The machine tool according to claim 1, wherein the cam carrier comprises an outside circumferential surface and a bore to receive the stroke eccentric.

13. The machine tool according to claim 12, wherein the cam carrier completely surrounds the stroke eccentric in a circumferential direction.

14. The machine tool according to claim 12, further comprising at least one catching device comprising a plurality of positive-locking recesses formed by tooth spaces in teeth circumferentially arranged around the cam carrier.

15. The machine tool according to claim 1, wherein the retaining stop comprises a thrust member configured to act upon the cam carrier with a frictional action between the cam carrier and the thrust member, whereby the retaining stop is configured to be releasable by overcoming said frictional action.

16. The machine tool according to claim 15, wherein the thrust member of the retaining stop is formed by the tool-side driving member.

17. The machine tool according to claim 1, wherein a movable lever is provided, which comprises the tool-side driving member and a cutting portion, and the movable lever is pivotably mounted about a pivoting axis extending between the cuffing portion and the tool-side driving member, the cutting portion comprising two longitudinal blades extending in a tool feed direction and spaced apart transversely thereto and a transverse blade extending transversely to the longitudinal blades at the end of the cutting portion remote from the pivoting axis, and longitudinal counterblades and a transverse counterblade on a shear housing of the machine tool are associated with the longitudinal blades and the transverse blade on the cutting portion.

18. The machine tool of claim 17, wherein, with movement of the adjusting cam into the space between the stroke eccentric and the tool-side driving member, the machine tool can be set either to a first operating state in which only the longitudinal blades and the longitudinal counterblades pass one another or to a second operating state in which the transverse blade and the transverse counterblade also pass one another.

* * * * *

UNITED STATES PATENT AND TRADEMARK OFFICE
CERTIFICATE OF CORRECTION

| | | |
|---|---|---|
| PATENT NO. | : 7,363,711 B2 | Page 1 of 1 |
| APPLICATION NO. | : 11/341901 | |
| DATED | : April 29, 2008 | |
| INVENTOR(S) | : Andreas Janutin, Andreas Neuweiler and Claus Böhringer | |

It is certified that error appears in the above-identified patent and that said Letters Patent is hereby corrected as shown below:

On the Title page, item (75); the third inventor's name should be --Claus Böhringer-- and not "Clause Böhringer".

In column 12, line 1, delete "cuffing" and insert --cutting--.

Signed and Sealed this

Twelfth Day of August, 2008

JON W. DUDAS
*Director of the United States Patent and Trademark Office*